US009445453B2

United States Patent
Lee et al.

(10) Patent No.: US 9,445,453 B2
(45) Date of Patent: Sep. 13, 2016

(54) DUAL-MODEM MOBILE EQUIPMENT AND COMMUNICATION METHOD USING THE SAME

(75) Inventors: Jai-Ho Lee, Anyang-si (KR); Jeong-Hoon Park, Suwon-si (KR); Sung-Wook Park, Seongnam-si (KR); Sun-Ju Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1387 days.

(21) Appl. No.: 12/925,749

(22) Filed: Oct. 28, 2010

(65) Prior Publication Data

US 2011/0116459 A1     May 19, 2011

(30) Foreign Application Priority Data

Nov. 19, 2009 (KR) ................ 10-2009-0112046

(51) Int. Cl.
| | | |
|---|---|---|
| *G01R 31/08* | (2006.01) | |
| *G06F 11/00* | (2006.01) | |
| *H04W 88/04* | (2009.01) | |
| *H04W 8/26* | (2009.01) | |

(Continued)

(52) U.S. Cl.
CPC ............... *H04W 88/04* (2013.01); *H04W 8/26* (2013.01); *H04W 72/087* (2013.01); *H04W 72/121* (2013.01)

(58) Field of Classification Search
CPC ..... H04W 28/04; H04W 88/04; H04W 8/26; H04W 72/087; H04W 72/121
USPC ............... 370/338, 337, 339, 328, 329, 330; 455/517, 219, 225, 551, 560
See application file for complete search history.

(56) References Cited

U.S. PATENT DOCUMENTS

| 8,576,846 B2* | 11/2013 | Kumar et al. ............... 370/392 |
| 2004/0076300 A1* | 4/2004 | Ishidoshiro .................. 380/277 |
| 2004/0105434 A1* | 6/2004 | Baw ............................ 370/355 |

(Continued)

FOREIGN PATENT DOCUMENTS

| KR | 10-2009-00995 51 | 9/2009 |
| WO | WO 2007/038781 A1 | 4/2007 |

OTHER PUBLICATIONS

Notification of the Reasons for Rejection dated Nov. 16, 2015 in connection with Korean Patent Application No. 10-2009-0112046; 10 pages.

(Continued)

*Primary Examiner* — Abdelnabi Musa (57) ABSTRACT

A communication method uses a dual-modem Mobile Equipment (ME) that includes a cellular modem communicable with a cellular system and a Wireless Local Area Network (WLAN) modem capable of WLAN communication. The method includes registering a Media Access Control (MAC) address of a Terminal Equipment (TE) connected to the cellular modem over a WLAN. The method also includes receiving data from the TE with the registered MAC address at the WLAN modem through a WLAN interface, and transferring the data to the cellular system through the cellular modem. Thus, even a TE with no cellular modem equipped can perform data communication over the cellular network and the pre-registered TE is allowed to transmit and receive data through an ME with a WLAN modem, facilitating efficient use of the limited resources, and the user is allowed to set priorities of TEs, making it possible to ensure QoS of each TE independently.

14 Claims, 9 Drawing Sheets

(51) Int. Cl.
*H04W 72/08* (2009.01)
*H04W 72/12* (2009.01)

(56) References Cited

U.S. PATENT DOCUMENTS

| | | | |
|---|---|---|---|
| 2005/0174943 A1* | 8/2005 | Wang | 370/235 |
| 2005/0185651 A1* | 8/2005 | Rinne | 370/395.1 |
| 2006/0050720 A1* | 3/2006 | Zaitsu | 370/401 |
| 2006/0052113 A1* | 3/2006 | Ophir et al. | 455/456.1 |
| 2006/0114855 A1* | 6/2006 | Zheng | 370/331 |
| 2006/0211402 A1* | 9/2006 | Hofmann | 455/355 |
| 2007/0070935 A1 | 3/2007 | Prakash et al. | |
| 2007/0072607 A1* | 3/2007 | Radhakrishnan et al. | 455/435.1 |
| 2007/0076665 A1* | 4/2007 | Nair et al. | 370/335 |
| 2007/0076690 A1* | 4/2007 | Dyck et al. | 370/352 |
| 2007/0097990 A1* | 5/2007 | Ozaki | H04L 29/06027 370/395.52 |
| 2007/0218897 A1* | 9/2007 | Yukizaki et al. | 455/432.1 |
| 2008/0009266 A1* | 1/2008 | Yamasaki et al. | 455/411 |
| 2008/0014934 A1* | 1/2008 | Balasubramanian et al. | 455/434 |
| 2008/0057956 A1* | 3/2008 | Black et al. | 455/435.1 |
| 2009/0005005 A1* | 1/2009 | Forstall et al. | 455/411 |
| 2009/0285175 A1* | 11/2009 | Nix | H04L 29/125 370/331 |
| 2010/0118847 A1 | 5/2010 | Lee et al. | |
| 2010/0329176 A1* | 12/2010 | Agarwal | H04L 1/0003 370/316 |
| 2013/0265971 A1* | 10/2013 | Henry et al. | 370/329 |
| 2014/0113613 A1* | 4/2014 | Huang et al. | 455/418 |

OTHER PUBLICATIONS

Decision of Grant dated May 21, 2016 in connection with Korean Patent Application No. 10-2009-0112046; 6 pages.

* cited by examiner

DUAL-MODEM MOBILE EQUIPMENT AND COMMUNICATION METHOD USING THE SAME

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Nov. 19, 2009 and assigned Serial No. 10-2009-0112046, the entire disclosure of which is hereby incorporated by reference.

TECHNICAL FIELD OF THE INVENTION

The present invention relates generally to a high-speed wireless data communication system, and more particularly, to a Mobile Equipment (ME) for enabling a Terminal Equipment (TE) equipped with a Wireless Local Area Network (WLAN) device to perform data communication with an external network using a cellular communication modem (hereinafter referred to as a "cellular modem" for short), and a communication method using the same.

BACKGROUND OF THE INVENTION

A Long Term Evolution (LTE) system, a typical example of the cellular communication systems, is a system proposed by the 3rd Generation Partnership Project (3GPP), in charge of standardization of the Universal Mobile Telecommunications System (UMTS) system. A LTE system can implement packet-based communication at a high transfer rate of a maximum of 100 Mbps. Many studies for commercialization thereof are now underway.

A WLAN is a small-scale wireless network, and a WLAN system has been widely used for its many advantages such as low network access costs and negligible maintenance, despite the non-supportability of mobility.

In the WLAN system, an Access Point (AP) is required to provide wireless services. The AP wirelessly communicates with TEs, and takes charge not only of signal exchange between the TEs but also of connections with an external network within its coverage. The AP may be made as a separate fixed device or as a module mountable in a computer system or an ME. In the latter case, the ME serves as an AP.

Figure 1:
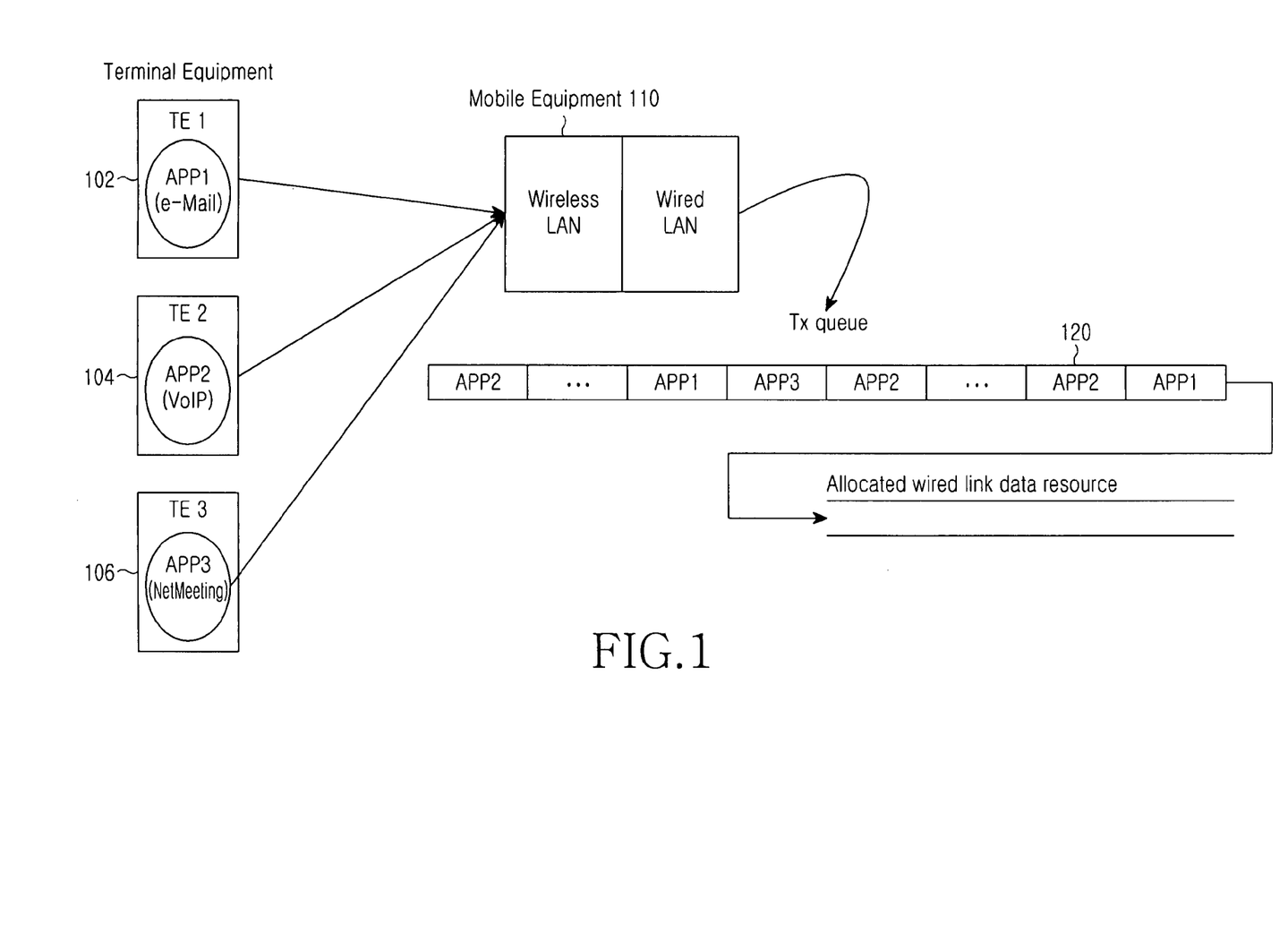
FIG. 1 shows a system for enabling a TE to access an external network using an ME.

FIG. 1 shows a system for enabling a TE to access an external network using an ME.

Referring to FIG. 1, a plurality of TEs 102, 104 and 106 may access the external network over a cellular system by accessing an ME 110 serving as an AP.

In the system of FIG. 1, if a user of the ME 110 (i.e., a WLAN AP) connected to the external network unlocks its access password, any TEs 102, 104 and 106 can access the external network by accessing the ME 110. In this case, information security of the network may not be ensured, and the available network capacity and the network speed may be reduced due to the unintentional sharing of the limited resources in the small-scale WLAN environment.

In the typical WLAN AP, data from a plurality of TEs requiring various applications (e.g., e-mail, Voice over Internet Protocol (VoIP), NetMeeting, and the like) shares a single channel, making it hard to ensure traffic Quality of Service (QoS) of the TEs requiring various types of services.

SUMMARY OF THE INVENTION

To address the above-discussed deficiencies of the prior art, it is a primary object to provide at least the advantages described below. Accordingly, an aspect of certain embodiments of the present invention is to provide an ME for enabling even a TE without a cellular modem to perform data communication with a cellular network through the ME, and a communication method using the same.

Another aspect of certain embodiments of the present invention is to provide an ME for enabling an access-allowed TE to make an access to a cellular network, and a communication method using the same.

Another aspect of certain embodiments of the present invention is to provide an ME capable of serving as a WLAN AP, which ensures QoS required by a plurality of TEs using a cellular network, and a communication method using the same.

In accordance with one aspect of the present invention, there is provided a communication method using a dual-modem Mobile Equipment (ME) that includes a cellular modem communicable with a cellular system and a Wireless Local Area Network (WLAN) modem capable of WLAN communication. The method includes registering a Media Access Control (MAC) address of a Terminal Equipment (TE) connected to the cellular modem over a WLAN. The method also includes receiving data from the TE with the registered MAC address at the WLAN modem through a WLAN interface. The method further includes transferring the data to the cellular system through the cellular modem.

In accordance with another aspect of the present invention, there is provided a dual-modem Mobile Equipment (ME) that includes a cellular modem communicable with a cellular system and a Wireless Local Area Network (WLAN) modem capable of WLAN communication, in which a terminal equipment manager registers a Media Access Control (MAC) address of a Terminal Equipment (TE) connected to the cellular modem over a WLAN, and a packet re-structuring unit receives data from the TE with the registered MAC address at the WLAN modem through a WLAN interface, and transfers the data to the cellular system through the cellular modem.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

FIGS. 2 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 2:
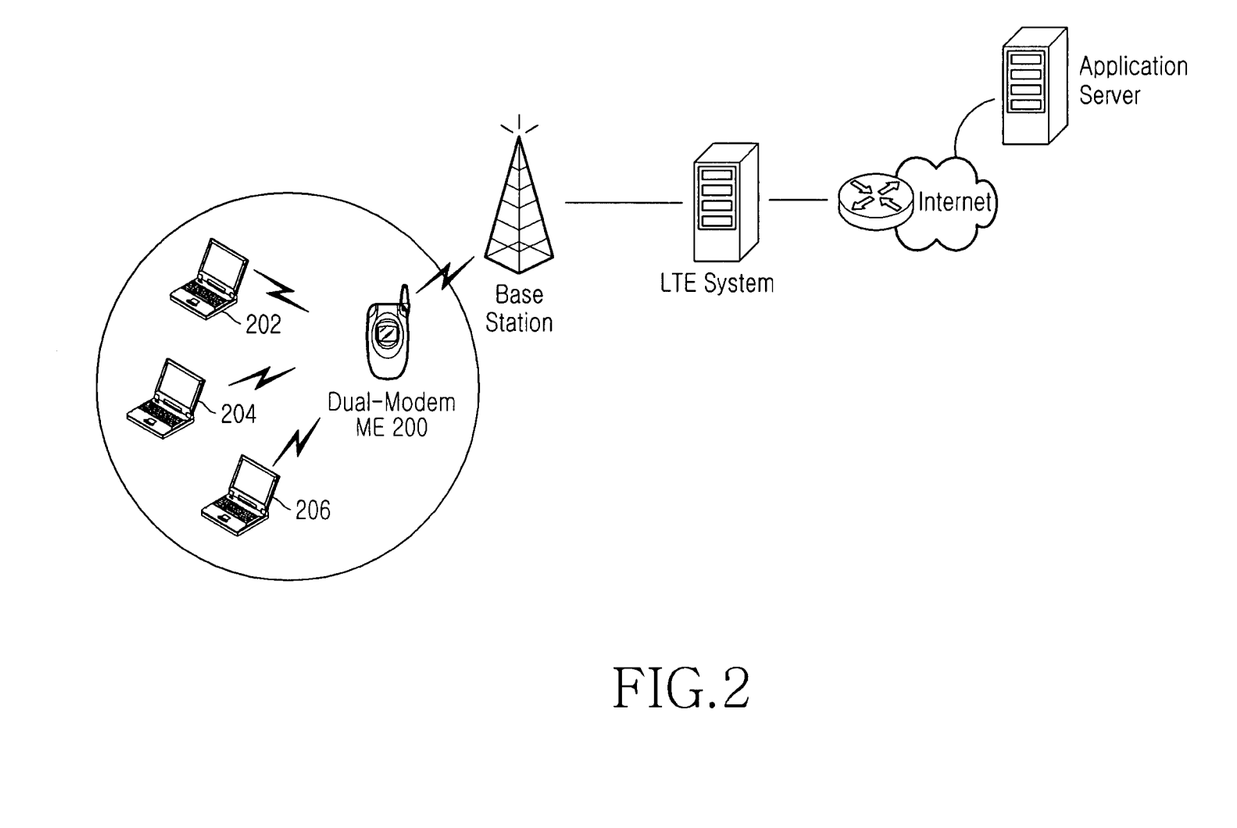
FIG. 2 shows a configuration of a system in which a plurality of TEs access an external network over a cellular system using a dual-modem ME.

FIG. 2 shows a configuration of a system in which an plurality of TEs access an external network over a cellular system using a dual-modem ME.

Referring to FIG. 2, an ME 200 refers to a device that includes a cellular modem and/or a WLAN modem capable of serving as an AP, and supports a connection to an external network over a cellular network by accepting the accesses by TEs 202, 204 and 206. In addition, a dual-modem ME refers to an ME that includes both a cellular modem and a WLAN modem, and unless specified otherwise, an ME may be construed as a dual-modem ME. The cellular modem may be, for example, an LTE modem. The ME may be any of various types of devices, including a cell phone capable of accessing a cellular system, a separate card mountable in a computer system to make it possible to access the cellular system, a Personal Computer (PC) capable of accessing the cellular system, and a notebook computer capable of accessing the cellular system.

The TEs 202, 204 and 206 each refer to a TE that can run one or more applications and includes at least one WLAN device driver. The TE may be any of various types of devices, including a notebook computer, a Personal Digital Assistant (PDA), a cell phone, and a game player, each of which can make an access to a WLAN. It will be understood by those of ordinary skill in the art that the WLAN may be supported by various short-range communication systems, including WiFi, M-Wimax, and Bluetooth®.

Figure 3:
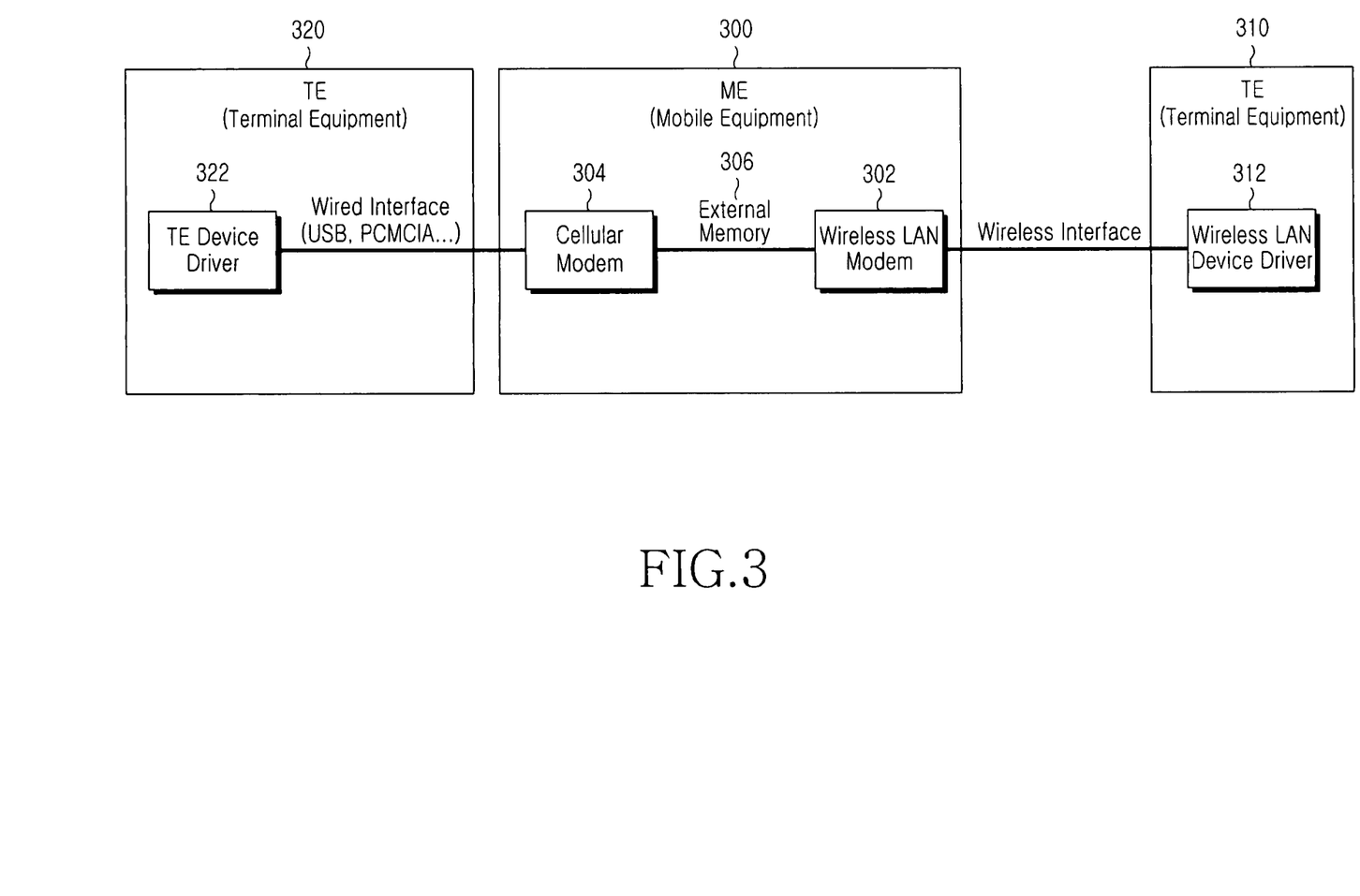
FIG. 3 schematically shows structures of a dual-modem ME and a WLAN TE.

FIG. 3 schematically shows structures of a dual-modem ME and a WLAN TE.

In the example of FIG. 3, an ME 300 and a WLAN TE 310 are provided, and a TE 320 is additionally shown, which can be generally connected to the ME 300 by means of a wired interface such as a Universal Serial Bus (USB) and a Personal Computer Memory Card International Association (PCMCIA) card. For example, the ME 300 made in the form of a PCMCIA card may be mounted in the TE 320 such as a notebook computer with a PCMCIA slot, thus creating a single device.

The TE 320 is a TE capable of communicating with a cellular modem 304 in the ME 300, and to this end, includes a device driver 322.

The WLAN TE 310, a TE capable of communicating with a WLAN modem 302 in the ME 300, includes a WLAN device driver 312, and is connected to the ME 300 through a WLAN-based wireless interface.

The ME 300 includes the cellular modem 304 and the WLAN modem 302. The cellular modem 304 and the WLAN modem 302 may perform data exchange through an external memory 306 or an Inter-Processor Communication (IPC).

Figure 4:
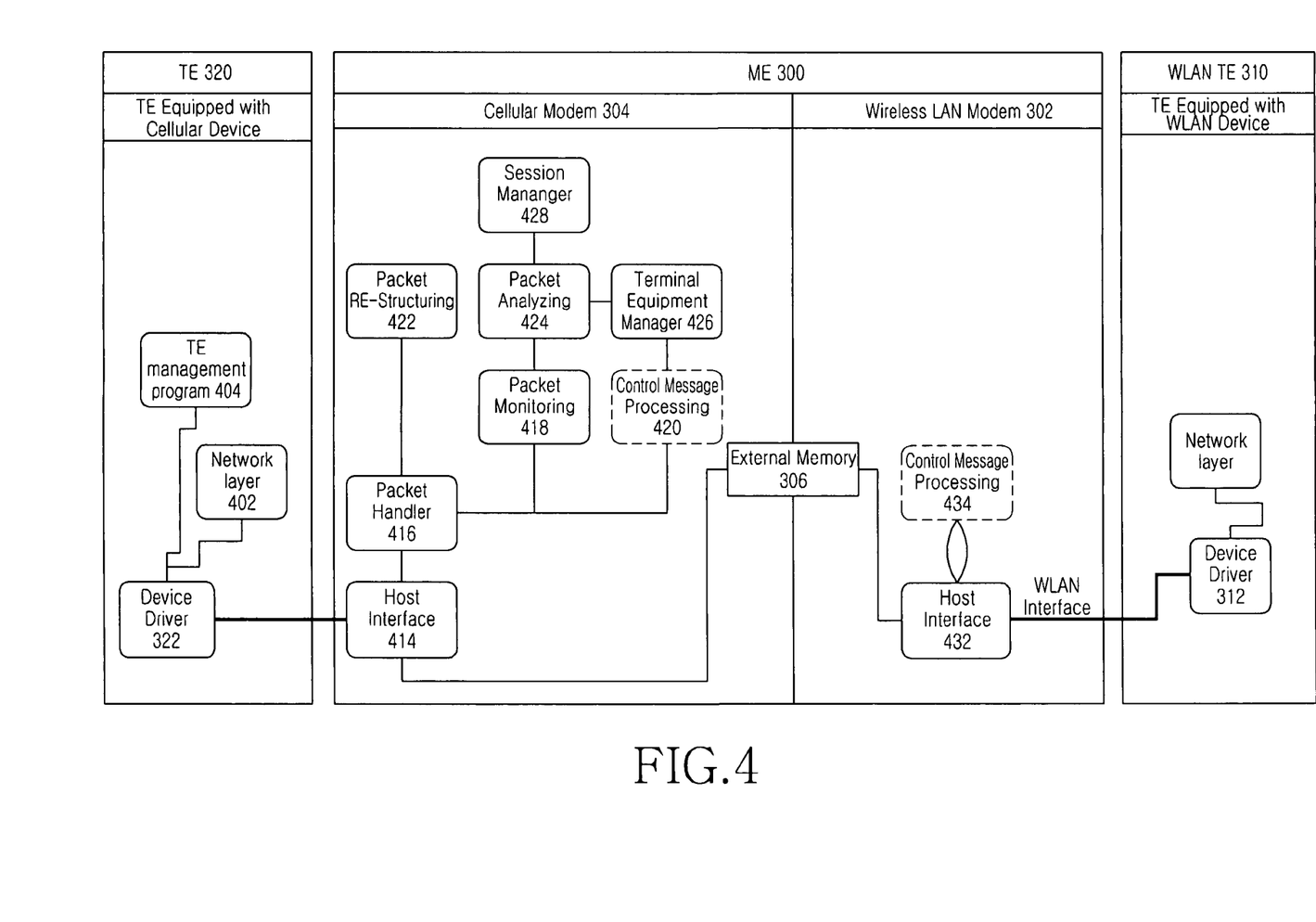
FIG. 4 shows detailed functional structures and data flows of a dual-modem ME and a WLAN TE.

FIG. 4 shows detailed functional structures and data flows of a dual-modem ME and a WLAN TE.

In receiving data by the cellular modem 304 in the ME 300, the cellular modem 304 may receive the data from the TE 320 connected through the wired interface (e.g., USB, PCMCIA, and the like), and may also receive the data, which has been received from the WLAN TE 310 at the WLAN modem 302 in the ME 300 through the WLAN interface and then transferred to the cellular modem 304 via the external memory 306.

A description will now be made of a process of establishing a connection between the TE 320 and the ME 300.

If application data to be transferred to the cellular system is generated in the TE 320 directly connected to the ME 300, the application data is transferred to the cellular modem 304 in the ME 300 through a network layer 402 and a device driver 322 in the TE 320 via the wired interface (e.g., USB, PCMCIA, and the like). In the cellular modem 304 of the ME 300, the application data is transferred to a packet monitoring unit 418 in an upper layer through a host interface 414 and a packet handler 416. If the application data is new application data, the packet monitoring unit 418 transfers the application data to a terminal equipment manager 426 via a packet analyzing unit 424. To transfer the application data to the cellular system, the terminal equipment manager 426 establishes a new wireless link, and adds packet filtering information of a packet for carrying the application data, in a packet filter list. As an option, the packet filter list may be stored in an internal memory. Thereafter, the terminal equipment manager 426 transfers the application data to the cellular system through the wireless link.

A description will now be made of a process of establishing a connection between the WLAN TE 310 and the ME 300.

The WLAN TE 310 connects with the WLAN modem 302 in the ME 300 and performs data communication with the external network through the cellular modem 304. The user adds a Media Access Control (MAC) address of the WLAN TE 310 in an allowed terminal list managed by the terminal equipment manager 426 in the ME 300, as an access-allowed TE. The MAC address may be added in the allowed terminal list using a TE management program 404 in the TE 320 connected to the ME 300. As an option, the allowed terminal list may be stored in the internal memory (not shown). As an option, generation and extraction of the MAC address may be performed by control message processing units 434 and 420 in the ME 300, respectively.

A description will now be made of a process in which the WLAN TE 310 accesses the WLAN modem 302 in the ME 300 and is allocated an IP address. Application data received from the WLAN modem 302 is transferred in sequence to a host interface 432 in the WLAN modem 302; the external memory 306; and the host interface 414, the packet handler 416, the packet monitoring unit 418, and the packet analyzing unit 424 in the cellular modem 304. The packet analyzing unit 424 reads MAC address information of an allowed TE from the terminal equipment manager 426, determines whether a MAC address of the received data is valid, and if so, allocates an IP address. The packet analyzing unit 424 sends the IP address to a session manager 428, which generates and/or allocates a dedicated channel for transferring the data to the cellular system, and adds packet filtering information of a packet for carrying the data, in the packet filter list.

After the dedicated channel is allocated, a packet restructuring unit 422 receives the data transferred by the WLAN TE 310 from the packet handler 416, re-structures the data to have a source IP address which is set as the IP address that the WLAN TE 310 is allocated, and transmits the re-structured data to the cellular system over the dedicated channel.

Figure 5:
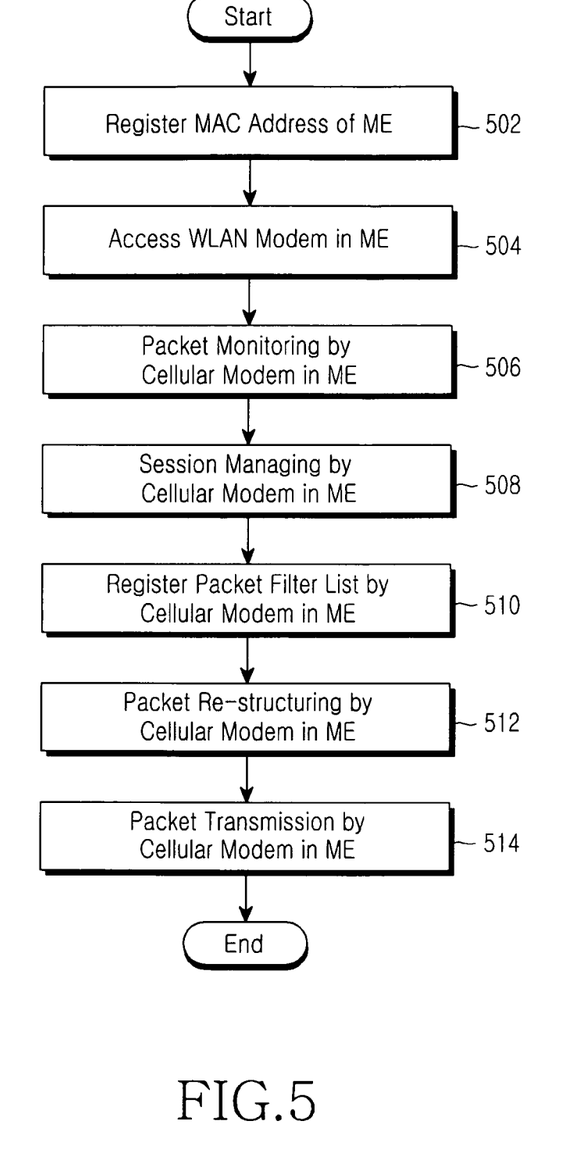
FIG. 5 shows a process of connecting a WLAN TE to an external network by a cellular modem in an ME according to an embodiment of the present invention.

FIG. 5 shows a process of connecting a WLAN TE to an external network by a cellular modem in an ME according to an embodiment of the present invention.

In block 502, the cellular modem 304 registers a MAC address of the WLAN TE 310 in an allowed terminal list. The cellular modem 304 may perform the registration using the TE management program 404 in the TE 320.

In block 504, the cellular modem 304 accesses the WLAN modem 302 in the ME 300 to exchange data with the WLAN TE 310.

If the data received at the WLAN modem 302 from the WLAN TE 310 is transferred to the cellular modem 304 via the external memory 306, the cellular modem 304 performs packet monitoring in block 506 to check whether the MAC address of the WLAN TE 310 is valid.

Upon success in the validity check for the MAC address of the WLAN TE 310, the cellular modem 304 performs session managing in block 508 to generate and/or allocate a dedicated channel between the WLAN TE 310 and the cellular system.

In block 510, the cellular modem 304 registers new packet filtering information in the packet filter list, for transferring of the data exchanged between the WLAN TE 310 and the cellular system.

The cellular modem 304 performs packet re-structuring to enable transmission of the data over the dedicated channel in block 512, and performs packet transmission to the cellular system over the dedicated channel in block 514.

While it has been described in the above process that the cellular modem 304 in the ME 300 connects the WLAN TE 310 to the external network, it should be noted that it is not intended to limit the scope of the present invention. That is, all of the above-described blocks should not necessarily be included in the process. For example, the operation of checking validity of the MAC address information and the operation of establishing a dedicated channel to a specific TE and performing communication with the TE may be carried out independently.

Figure 6:
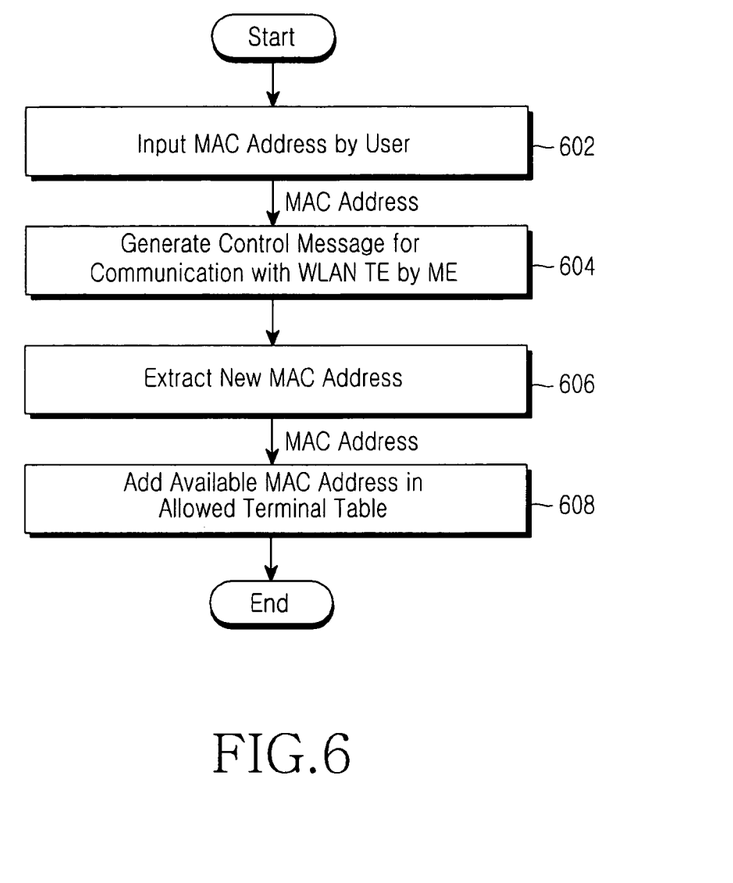
FIG. 6 shows a detailed MAC address registration operation according to an embodiment of the present invention.

FIG. 6 shows a detailed MAC address registration operation (e.g., the operation depicted in block 502) according to an embodiment of the present invention.

In block 602, the user inputs a MAC address he or she will use for the WLAN TE 310. For example, the MAC address may be input through the TE management program 404 in the TE 320. In block 604, the TE 320 generates a control message for communication with the ME 300 and transfers the control message carrying the MAC address to the ME 300. In block 606, upon receiving the control message, the ME 300 extracts the MAC address to be used for the WLAN TE 310 from the control message. The extracted MAC address is added in the allowed terminal list in block 608.

An example of the allowed terminal list is shown in Table 1. The allowed terminal list includes a MAC address of the TE and IP information allocated to the TE, and as an option, may include an identifier (ID) of each session as well.

TABLE 1

| Session ID | MAC Address | TE IP address |
|---|---|---|
| 1 | m1 | i1 |
| 2 | m2 | i2 |

Figure 7:
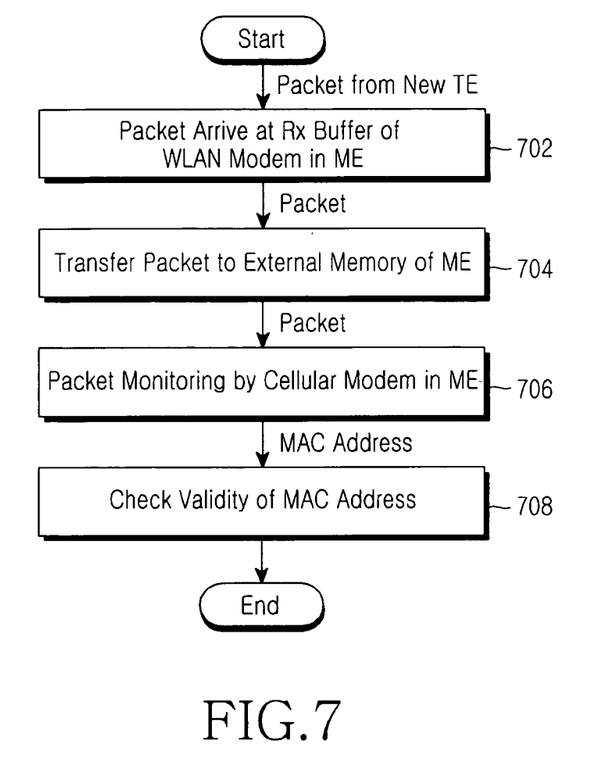
FIG. 7 shows an access operation to a WLAN modem in an ME by a WLAN TE and a MAC address validity check operation for the WLAN TE according to an embodiment of the present invention.

FIG. 7 shows a detailed access operation (e.g., the operation depicted in block 504) to a WLAN modem in an ME by a WLAN TE and a detailed MAC address validity check operation (e.g., the operation in block 506) for the WLAN TE according to an embodiment of the present invention.

In block 702, the WLAN modem 302 in the ME 300 receives a packet including data from the WLAN TE 310, and stores the packet in a receive buffer (not shown). In block 704, the packet is transferred to the cellular modem 304 through the external memory 306 in the ME 300. In block 706, the cellular modem 304 extracts the MAC address of the WLAN TE 310 from the received packet. In block 708, the cellular modem 304 in the ME 300 checks validity of the MAC address referring to the allowed terminal list, and allocates an IP address for the WLAN TE 310 if the MAC address is included in the allowed terminal list.

Figure 8:
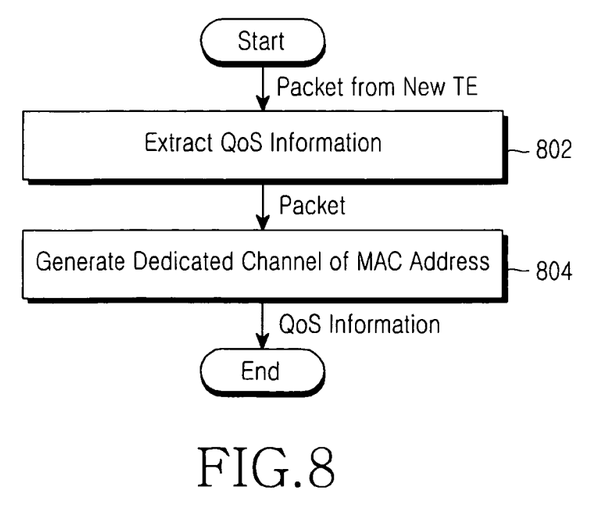
FIG. 8 shows a dedicated channel allocation operation for a WLAN TE according to an embodiment of the present invention.

FIG. 8 shows a detailed session managing operation (e.g., the operation depicted in block 508) for allocating a dedicated channel for a WLAN TE according to an embodiment of the present invention.

In block 802, the cellular modem 304 in the ME 300 analyzes the packet from the WLAN TE 310 and extracts QoS information therefrom. In block 804, the cellular modem 304 generates and allocates a dedicated channel for the WLAN TE 310 associated with the MAC address included in the packet based on the QoS information.

Figure 9:
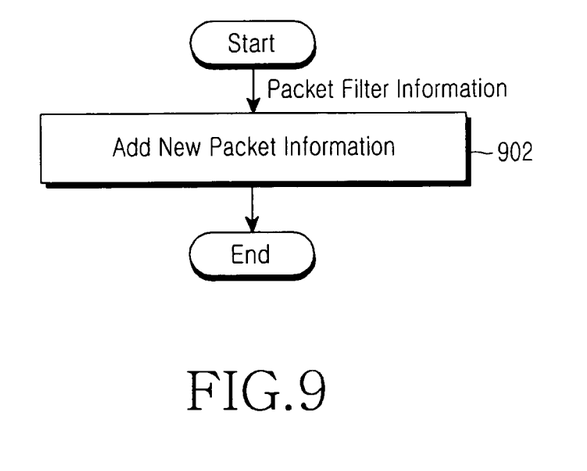
FIG. 9 shows a detailed operation of adding packet filtering information in a packet filter list according to an embodiment of the present invention.

FIG. 9 shows a detailed operation (e.g., the operation depicted in block 510) of adding packet filtering information in a packet filter list according to an embodiment of the present invention.

In block 902, the cellular modem 304 in the ME 300 adds, in the packet filter list, packet filtering information for the WLAN TE 310 to which the dedicated channel is allocated.

Table 2 below shows one example of a structure of the packet filter list.

TABLE 2

| Session ID | Source IP address | Destination IP address | Source port | Destination port | Protocol | TE IP address |
|---|---|---|---|---|---|---|
| 1 | a1 | b1 | c1 | d1 | e1 | f1 |
| 2 | a2 | b2 | c2 | d2 | e2 | f2 |

Respective filtering information includes a source port number and a destination port number in addition to a source IP address and a destination IP address, and as an option, includes protocol information, allocated IP information for each TE, and session ID information. The protocol may be various IP-based communication protocols, such as Hyper-Text Transfer Protocol (HTTP), File Transfer Protocol (FTP), Simple Mail Transfer Protocol (SMTP), and Post Office Protocol version 3 (POP3).

Figure 10:
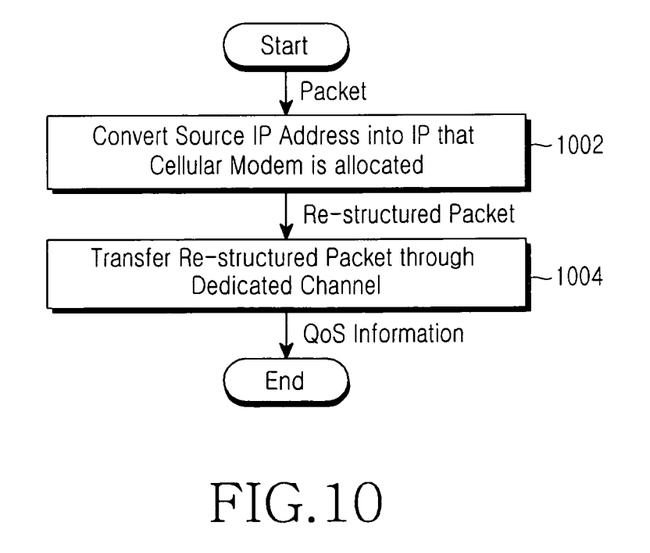
FIG. 10 shows a detailed packet re-structuring and transmission/reception operation according to an embodiment of the present invention.

FIG. 10 shows a detailed packet re-structuring and transmission/reception operation (e.g., the operations depicted in blocks 512 and 514) according to an embodiment of the present invention.

In block 1002, the cellular modem 304 in the ME 300 replaces the source IP address of the generated dedicated channel with an IP address that the cellular modem 304 is allocated for the WLAN TE 310, thereby enabling the WLAN TE 310 to communicate with the external network. In block 1004, the cellular modem 304 in the ME 300 transmits the packet for communication with the WLAN TE 310 through the allocated dedicated channel.

Figure 11:
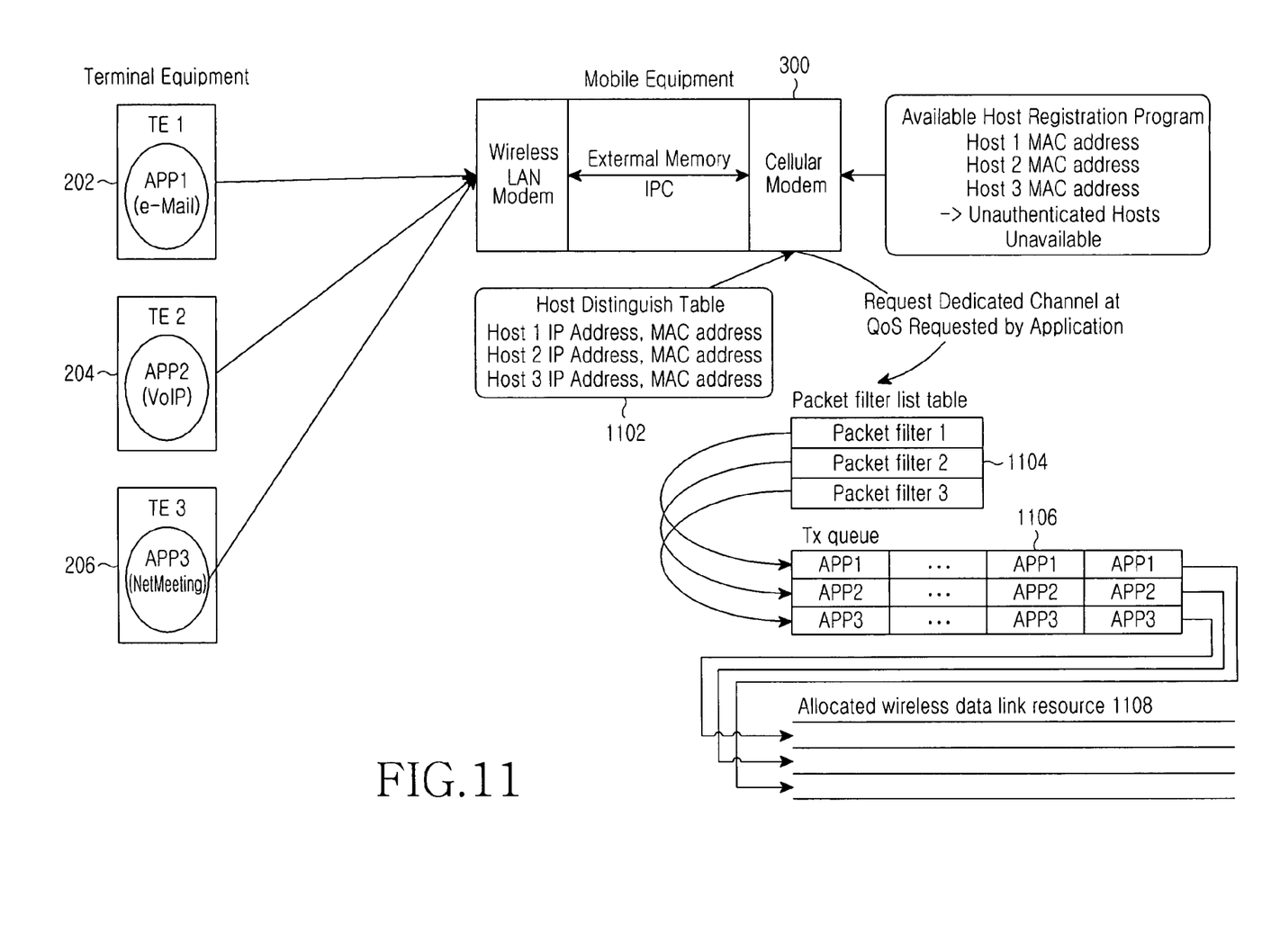
FIG. 11 shows a configuration in which a TE communicates with an external network using a dual-modem ME according to an embodiment of the present invention.

FIG. 11 shows a configuration in which a plurality of TEs communicate with an external network using a dual-modem ME according to an embodiment of the present invention.

A plurality of TEs 202, 204 and 206 with a WLAN device driver may each exchange different types of application data (e.g., e-Mail, VoIP, NetMeeting data) with the external network through the ME 300. The ME 300 checks validity of each of the TEs 202, 204 and 206 by managing a host distinguish list 1102 storing IP addresses and MAC addresses of accessible TEs. By doing so, the TE, which is not access-allowed by the user, cannot use or access the ME 300.

The ME 300 includes a packet filter list table 1104 for storing packet filtering information for each dedicated channel satisfying the QoS requested by a relevant application, and a transmission (Tx) queue 1106 for distinguishing application data associated with each dedicated channel and storing the application data in sequence. For each dedicated channel, dedicated wireless data link resources 1108 are allocated to each application individually. Each of the TEs 202-206 allowed to access the ME 300 is allocated its own IP address, and is allocated its own dedicated channel using the packet filter information and QoS information for its application data. By using the QoS information, the user can set service priorities in the process of setting up a dedicated channel for the TE. For example, a high-priority transmission queue may be allocated to high-priority VoIP application data.

The above operation may be implemented by providing a memory device storing program codes to each component of the ME. That is, each component of the ME 300 executes the above operation by reading the program codes stored in the memory device and executing the read program codes by means of a processor or a Central Processing Unit (CPU).

As is apparent from the foregoing description, even a TE with no cellular modem equipped can perform data communication over the cellular network by accessing an ME with a cellular modem and a WLAN modem. In addition, the pre-registered TE is allowed to transmit and receive data through an ME with a WLAN modem, facilitating efficient use of the limited resources, and the user is allowed to set priorities of TEs, making it possible to ensure QoS of each TE independently.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method using a dual-modem mobile equipment (ME) having a cellular modem communicable with a cellular system and a wireless local area network (WLAN) modem capable of WLAN communication, the communication method comprising:
   registering, in a terminal list of the cellular modem, a media access control (MAC) address of a terminal equipment (TE) connected over a WLAN;
   receiving first data from the TE with the registered MAC address at the WLAN modem through a WLAN interface;
   allocating a dedicated channel for the TE with the registered MAC address based on quality of service (QoS) information of the first data;
   allocating a dedicated wireless data link resource for the dedicated channel to an individual application;
   generating second data by including an internet protocol (IP) address of the TE using the dedicated channel, in the first data;
   adding filtering information of a packet for the second data in a packet filter list; and
   transmitting the second data to the cellular system through the dedicated channel in the cellular modem.

2. The communication method of claim 1, wherein registering the MAC address comprises registering a record including the MAC address and information on an internet protocol (IP) address allocated to the TE.

3. The communication method of claim 1, wherein the filtering information comprises a source IP address, a destination IP address, a source port number, a destination port number, protocol information, and IP information allocated to the TE.

4. The communication method of claim 1, wherein service priorities are set in a process of allocating the dedicated channel based on the QoS information of the first data.

5. A dual-modem mobile equipment (ME) having a cellular modem communicable with a cellular system and a wireless local area network (WLAN) modem capable of WLAN communication, the dual-modem ME including a processor coupled to a memory storing instruction comprising:
   a terminal equipment manager configured to register, in a terminal list of the cellular modem, a media access control (MAC) address of a terminal equipment (TE) connected over a WLAN;
   a packet re-structuring unit configured to receive first data from the TE with the registered MAC address at the WLAN modem through a WLAN interface, generate second data by including an internet protocol (IP)

address of a dedicated channel, and transmit the second data to the cellular system through the dedicated channel in the cellular modem; and a session manager configured to
allocate the dedicated channel for the TE with the registered MAC address based on quality of service (QoS) information of the first data,
allocate a dedicated wireless data link resource for the dedicated channel to an individual application, and
add filtering information of a packet for the second data in a packet filter list.

6. The dual-modem ME of claim 5, wherein the terminal equipment manager is configured to register in a memory a record including the MAC address and information on an internet protocol (IP) address allocated to the TE.

7. The dual-modem ME of claim 5, wherein the filtering information comprises a record comprising a source IP address, a destination IP address, a source port number, a destination port number, protocol information, and IP information allocated to the TE.

8. The dual-modem ME of claim 5, wherein service priorities are set in a process of allocating the dedicated channel based on the QoS information of the first data.

9. A dual-modem mobile equipment (ME) having a cellular modem communicable with a cellular system and a wireless local area network (WLAN) modem capable of WLAN communication, the dual-modem ME including a processor coupled to a memory storing instruction comprising:
a terminal equipment manager configured to register, in a terminal list of the cellular modem, a media access control (MAC) address of a terminal equipment (TE) connected over a WLAN;
a packet re-structuring unit configured to receive first data from the TE with the registered MAC address at the WLAN modem through a WLAN interface, generate second data by including an internet protocol (IP) address of a dedicated channel, and transmit the second data to the cellular system through the dedicated channel in the cellular modem;
a session manager configured to
allocate the dedicated channel for the TE with the registered MAC address based on quality of service (QoS) information of the first data,
allocate a dedicated wireless data link resource for the dedicated channel to an individual application, and
add filtering information of a packet for the second data in a packet filter list; and
a memory configured to be accessed by the cellular modem and the WLAN modem.

10. The dual-modem ME of claim 9, wherein the terminal equipment manager is configured to register in the memory a record including the MAC address and information on an internet protocol (IP) address allocated to the TE.

11. The dual-modem ME of claim 9, wherein the filtering information comprises a record comprising a source IP address, a destination IP address, a source port number, a destination port number, protocol information, and IP information allocated to the TE.

12. The dual-modem ME of claim 9, further comprising a packet handler configured to transfer the second data to the packet monitoring unit.

13. The dual-modem ME of claim 9, wherein the cellular modem comprises a host interface configured to communicate with the TE.

14. The dual-modem ME of claim 9, wherein service priorities are set in a process of allocating the dedicated channel based on the QoS information of the first data.

* * * * *